(12) United States Patent
Berko et al.

(10) Patent No.: US 12,450,341 B2
(45) Date of Patent: Oct. 21, 2025

(54) USER BEHAVIOR ANOMALY DETECTION-SENSORS

(71) Applicant: Acronis International GmbH, Schaffhausen (CH)

(72) Inventors: Nickolay Berko, Schaffhausen (CH); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 422 days.

(21) Appl. No.: 17/804,835

(22) Filed: May 31, 2022

(65) Prior Publication Data

US 2023/0385404 A1 Nov. 30, 2023

(51) Int. Cl.
G06F 21/55 (2013.01)

(52) U.S. Cl.
CPC ...... *G06F 21/552* (2013.01); *G06F 2221/034* (2013.01)

(58) Field of Classification Search
CPC ... G06F 21/55; G06F 2221/034; G06F 21/552
See application file for complete search history.

(56) References Cited

U.S. PATENT DOCUMENTS

| | | | |
|---|---|---|---|
| 6,769,066 B1 | 7/2004 | Botros et al. | |
| 8,914,878 B2 | 12/2014 | Burns et al. | |
| 10,412,106 B2 | 9/2019 | Srivastava et al. | |
| 11,005,864 B2 | 5/2021 | Saunders et al. | |
| 11,012,454 B1 | 5/2021 | Han et al. | |
| 11,095,735 B2 * | 8/2021 | Gavin | H04L 43/06 |
| 11,210,419 B2 | 12/2021 | Beloussov et al. | |
| 11,303,670 B1 * | 4/2022 | Wueest | H04L 63/145 |
| 2006/0123101 A1 * | 6/2006 | Buccella | G06F 21/552 |
| | | | 709/223 |

(Continued)

FOREIGN PATENT DOCUMENTS

| | | |
|---|---|---|
| CN | 106534212 A | 3/2017 |
| CN | 108121795 B | 7/2021 |

(Continued)

*Primary Examiner* — Tod R Swann
*Assistant Examiner* — Daniel Elahian
(74) *Attorney, Agent, or Firm* — ESPE Legal Consultancy FZ-LLC

(57) ABSTRACT

A system to optimize required resources at an endpoint needed to monitor a user behavior for abnormalities with the endpoint includes a processor processing a plurality of agents running at the endpoint to intercept network traffic metrics, intercept device access metrics, intercept app-specific user-mode metrics, parse intercepted data, and submit the intercepted data to a backend component at a server to collect the intercepted data from the endpoint, predict deviation from a normal profile, in which the backend component assesses available characteristics of a particular endpoint, calculates an endpoint user profile, calculates a degree of variance (DoV) between the user profile and the normal profile, compares the calculated DoV to a predetermined Variance Threshold (VT), and predicts, based on machine learning algorithms, a movement of a trend of the DoV within the VT, creates an adjusted metrics list, and distributes adjusted metrics to a related endpoint.

17 Claims, 2 Drawing Sheets

(56) References Cited

U.S. PATENT DOCUMENTS

| | | |
|---|---|---|
| 2010/0325074 A1 | 12/2010 | Ng et al. |
| 2016/0127501 A1* | 5/2016 | Murti ............... H04L 67/63 |
| | | 709/204 |
| 2016/0234167 A1* | 8/2016 | Engel ............ H04L 63/1408 |
| 2017/0126704 A1* | 5/2017 | Nandha Premnath ............... |
| | | G06F 21/566 |
| 2021/0042199 A1 | 2/2021 | Migga-Vierke et al. |

FOREIGN PATENT DOCUMENTS

| | | |
|---|---|---|
| CN | 113961438 A | 1/2022 |
| WO | WO2012051470 A1 | 4/2012 |
| WO | WO2017113677 A1 | 7/2017 |

\* cited by examiner

USER BEHAVIOR ANOMALY DETECTION-SENSORS

TECHNICAL FIELD

The present invention pertains to computer systems and the early detection of an abnormal user behavior process optimization to minimize resource consumption at a protected endpoint and other components.

BACKGROUND

Nowadays, with a growing number of remote workers, organizations may face additional security threats. One example is the threat from those with inside access. Another is the need for enhanced endpoint protection. Potential threats from the insiders include threats to both security and productivity.

An insider can be considered malicious, compromised, occasional, or low-performance. For example, a malicious insider is an employee or a contractor with privileged access to IT systems and who intends to perform a cyberattack against an organization. Such an attack may include stealing a company's intellectual property or compromising sensitive data or valuable inside knowledge or trade secrets. An insider can become compromised when attackers compromise a privileged user account or trusted host on a network. With a compromised insider, attackers can exploit the insider's privileges to gain unauthorized access to an organization's data. Another vulnerable insider a regular employee who shares the company's intellectual property or sensitive data by mistake. For example, employees or corporate insiders are frequently targeted by phishing attacks and such attacks are frequently successful. Another vulnerable insider is an employee who faces personal issues that are affecting individual performance within an organization. Such employees are well known to be security risks because of their vulnerability to manipulation or bribery by attackers.

For the cases such as these and others, a change in a user's behavior in the system may be observed and noticed. One of the traditional approaches to detect abnormal user behavior is utilizing User and Entity Behavior Analytics (UEBA) systems. However, such systems are limited in collecting the data from user endpoints through the agents, and in many cases can be used only when the endpoints are available in corporate networks, which is not the case for many remote workers.

Therefore, new approaches in identifying abnormal user behavior at the endpoint outside of corporate networks are needed to protect a company's intellectual property and sensitive data from a variety of insider vulnerabilities.

SUMMARY

The present invention is directed to providing a system and a method to reduce performance impact to an endpoint by optimizing a number of collected, submitted, and analyzed metrics at a specific point of time.

A number of parameters required to be collected from a specific endpoint might be significant which impacts the particular endpoint performance.

These metrics are collected at a central database and are analyzed to build a "normal profile." The normal profile can be used later to check an employee's newly observed activities against it to detect an unusual behavior and to raise alerts, create incidents, enforce more restrictive policies, or even block the account.

A particular employee's profile can be compared to a set of similar profiles of colleagues from the same department. The comparison can be based on an organizational structure obtained from an Active Directory or a Lightweight Directory Access Protocol (LDAP) or any other type of employee clustering or grouping, for example, based on behavioral analysis.

To analyze wide areas of a user behavior and to evaluate different insider types, a significant number of metrics or sensors might be required. Collecting, submitting, and analyzing the required metrics from the user affects the endpoint performance.

The present invention proposes an approach to optimize data collection and an analysis process from a particular endpoint, a user group, or an individual user for an abnormal user behavior monitoring process.

Based on different types of previously mentioned insiders and different endpoint types, there could be a large array of different metrics collected from the user endpoint to identify abnormal behavior.

Collection of such data and submission to a central database might impact performance of the endpoint. The present invention proposes an approach to optimize required data for a specific endpoint.

For every type of endpoint, a user group or an individual user proposed system would define a list of required data or parameters to use and to automatically apply such a list to minimize required resources to support the abnormal behavior detection process.

Based on a historical data system, a minimal number of metrics and submission frequency can be defined for every type of endpoint, a user group, or an individual user.

In case of any deviations from a "normal profile" defined based on a minimal number of metrics, the proposed system would define required metrics extension for every type of endpoint, a user group, or an individual user.

The system automatically applies extended metrics and starts collecting data for the abnormal behavior detection process. The frequency of re-definition of required metrics r depends on a deviation degree from a "normal profile." Alternatively, the re-definition frequency depends on other factors, such as the type of endpoint, the user group, or an individual user.

BRIEF DESCRIPTION OF DRAWINGS

The exemplary aspects of the invention will be better understood from the following detailed description of the exemplary embodiments of the invention with reference to the drawings.

DETAILED DESCRIPTION

The present invention is directed to a system and a method that could be an add-on to an existing user behavior analysis system and method, such that some components may be in common. These components would be also described here to define the full process and possible deep integration of the present invention to a user behavior analysis system.

The proposed system could also work as an independent system where an external algorithm to define deviation from "normal profile" should be implemented.

In an exemplary aspect of the present invention, the proposed system includes multiple components. In an exemplary embodiment, two components are used.

The first component is a specific agent process at an endpoint machine that collects the required metrics and uploads the collected metrics to the backend on a periodic basis.

A list of required metrics as well as collection frequency could be increased or decreased by the system based on a predictive model according to different parameters, such as but not limited to detected abnormality deviation, incident historical data, type of the endpoint, a degree of variance (DoV), a variance threshold (VT), and a user group or individual user type.

Increasing the number of metrics or frequency of data collection or submission reduces the performance of the endpoint. Decreasing the number of metrics or frequency of data collection or submission improves the performance of the endpoint.

The solution includes a few modes. One of these modes is a Developing Predictive Model Mode (DPMM). At this stage all the possible metrics from the chosen or all endpoints with the high frequency are collected.

The system does not update any metrics at the endpoint. Endpoint performance is not yet optimized.
Historical incident data is collected. Alternatively, existing data can be used to build a machine learning predictive model. This data is used to train the machine learning model for predictive analysis. Such data should be collected continuously to improve the predictive model over time. One of the results of the machine learning model is that there is a shorter list of metrics to monitor. Once a machine learning model is trained, the system operates in normal mode as described above.

Figure 1:
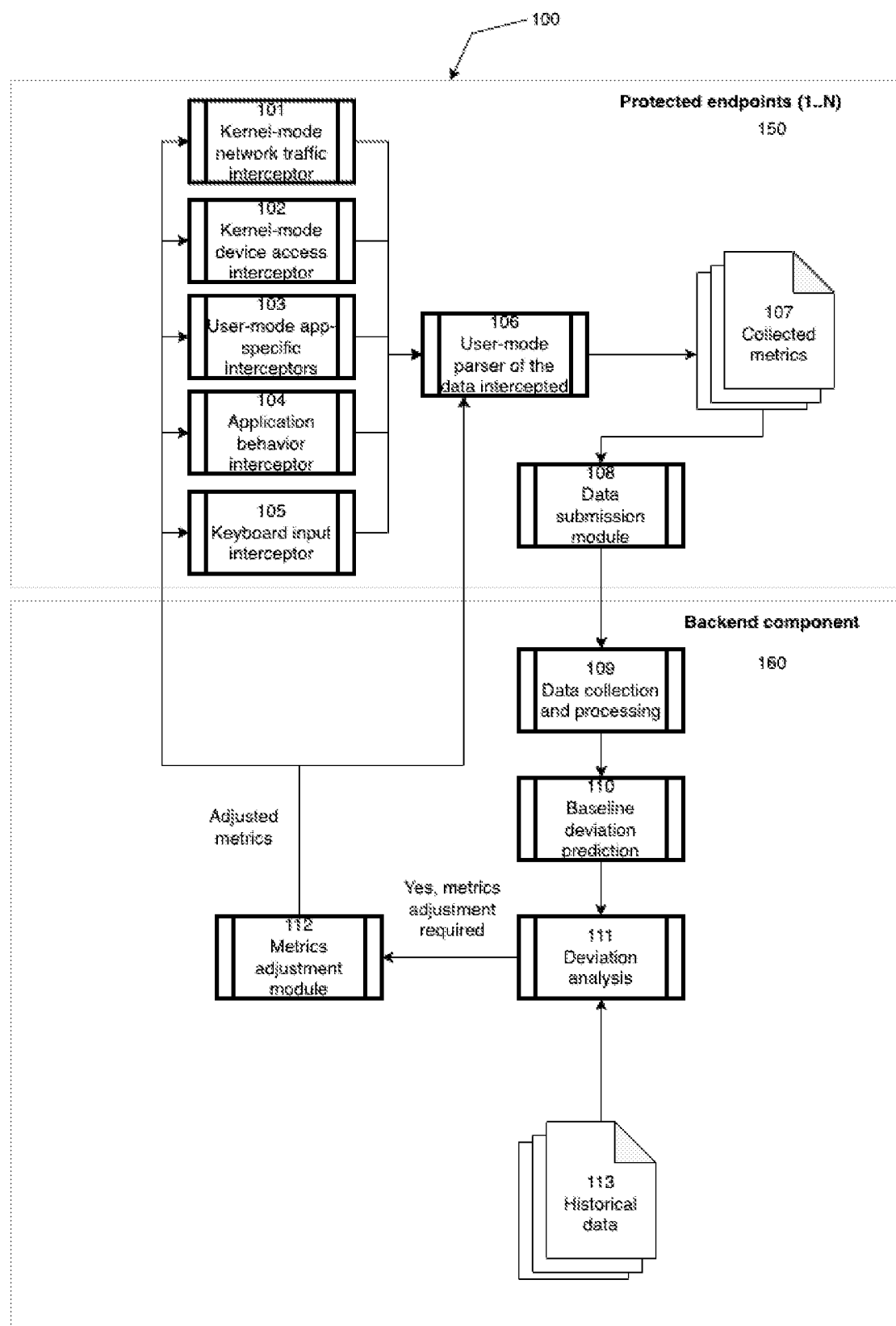
FIG. 1 shows an exemplary procedure for components and interactions of a Resource Optimizer for Behavior Monitor system according to an exemplary embodiment.

FIG. 1 shows an exemplary procedure for components and interactions of a Resource Optimizer for Behavior Monitor (ROBM) system (100) according to an exemplary embodiment.

The system (100) includes a processor (e.g., Central Processing Unit (CPU)) of a computer coupled to a memory that stores instructions that are implemented by the processor.

The processor is configured to implement the instructions to process various modules and components as described below.

More specifically, in system (100), the metrics adjustment module (112) defines a list of required metrics to monitor and update the list and to process at network traffic interceptor (101), device access interceptor (102), user-mode app-specific interceptor (103), and user-mode parser of the data intercepted (106) by the above listed components.

Network traffic interceptor (101) collects metrics related to the network activities performed from the endpoint.

Device access interceptor (102) collects metrics related to user access to external devices from the user endpoint.

User-mode app-specific interceptor (103) collects the metrics related to a user and app specific behavior.

Application behavior interceptor (104) collects the metrics related to actions of an application such as binary scripting-.

Keyboard input interceptor (105) collects the input from the keyboard such as user wording specifics (rhetoric), topics and input characteristics.

User-mode parser of the data intercepted (106) parses data and prepares the data (collected metrics 107) for submission to the back end.

Data submission module (108) submits the data based on defined frequency by metrics adjustment module (112).

Data collection and processing module (109) receives the data from the end point.

Baseline deviation prediction (110) predicts a deviation of a "user profile" from a "normal profile"

Deviation analysis module (111) proposes a number of metrics based on the deviation.

Metrics adjustment module (112) provides a metrics distribution process back to the endpoint.

Historical data module (113) provides metrics and incidents data for a machine learning prediction model.

The agent for monitoring the events on the protected endpoint (150) comprises one or more components. In an exemplary embodiment, in system (100), for example, the following five components are used:
Network traffic interceptor (101);
Device access interceptor (102);
User-mode app-specific interceptor (103);
Application behavior interceptor (104);
Keyboard input interceptor (105);
User-mode parser of the data intercepted by the above listed components (106); and
Data submission module (108) to the backend component (160) at a server.

Each interceptor contains several metrics which can be defined by the backend component (160) depending on the needs at the specific point in time.

User-mode parser (106) processes the intercepted data and stores it in a structured way as collected metrics 107 at the end point 150.

Data submission module (108) sends the data at the defined frequency by the system (100) based on different parameters such as but not limited to detected abnormality deviation, incident historical data, type of the endpoint, and a user group or individual user type.

The second component is a set of modules at the backend which collects and processes the data from the endpoint and makes optimization of the required metrics at the specific point of time.

The backend set of modules includes a few components. In an exemplary embodiment, for example, the following modules are used:
Data collection and processing module (109);
Baseline deviation prediction module (110);
Deviation status analysis module (111);
Metrics adjustment module (112); and
Incident historical data storage (113).

Data collection and processing module (109) receives the data from all the endpoints and stores the data at the backend.

Baseline deviation prediction module (110), assesses the available characteristics of the particular endpoint, calculates endpoint "user profile" and compares it to a "normal profile" or a baseline for calculating the degree of variance (DoV) (this step is usually part of the user behavior analysis system), compares the calculated DoV to the predetermined Variance Threshold (VT) (this step is usually part of the user behavior analysis system), and makes a prediction based on machine learning algorithms on a movement of DoV trend within the predetermined Variance Threshold (VT) in case the DoV is within the VT.

If the DoV prediction trend is not changing against the VT, then the system (100) determines that the behavior of the monitored user is normal. No action is taken.

If the DoV prediction trend is going up against the VT, then the system (100) determines that the risk of abnormal behavior is growing, and the number of metrics monitored at this specific point of time needs to be increased.

If the DoV prediction trend is going down against the VT, then the system (100) determines that the risk of abnormal behavior is going down and the number of metrics monitored at this specific point of time needs to be decreased.

In case the DoV is higher than the predetermined VT, the system determines that endpoint user behavior is abnormal and creates an incident for the admin or shares it with any other system to react.

Deviation analysis module (111) proposes several metrics to add or remove for monitoring at the end point. Deviation analysis module (111) shares the list of new metrics to metrics adjustment module (112).

Metrics adjustment module (112) submits an adjusted list of metrics to all agents at the end point.

Deviation analysis module (111) proposes a frequency to collect and submit the required metrics from the end point. Deviation analysis module (111) shares the frequency to metrics adjustment module (112).

Metrics adjustment module (112) submits an adjusted metrics collection or submission frequency to all agents at the endpoint.

According to the exemplary embodiment, system (100) optimizes required resources at an endpoint needed to monitor a user behavior for abnormalities with the endpoint.

As set forth above, system (100) includes a processor coupled to a memory that stores instructions.

The processor is configured to implement the instructions to process a plurality of agents running at the endpoint to intercept network traffic metrics, intercept device access metrics, intercept app-specific user-mode metrics, parse intercepted data, and submit the intercepted data to a backend component (160).

The processor is further configured to implement the instructions to process the backend component (160) at a server to collect the intercepted data from the endpoint, predict deviation from a normal profile, in which the backend component (160) assesses available characteristics of a particular endpoint, calculates an endpoint user profile, calculates a degree of variance (DoV) between the user profile and the normal profile, compares the calculated DoV to a predetermined Variance Threshold (VT), and predicts, based on machine learning algorithms, a movement of a trend of the DoV within the VT, propose an adjusted metrics list, and distribute new metrics to a related endpoint.

Figure 2:
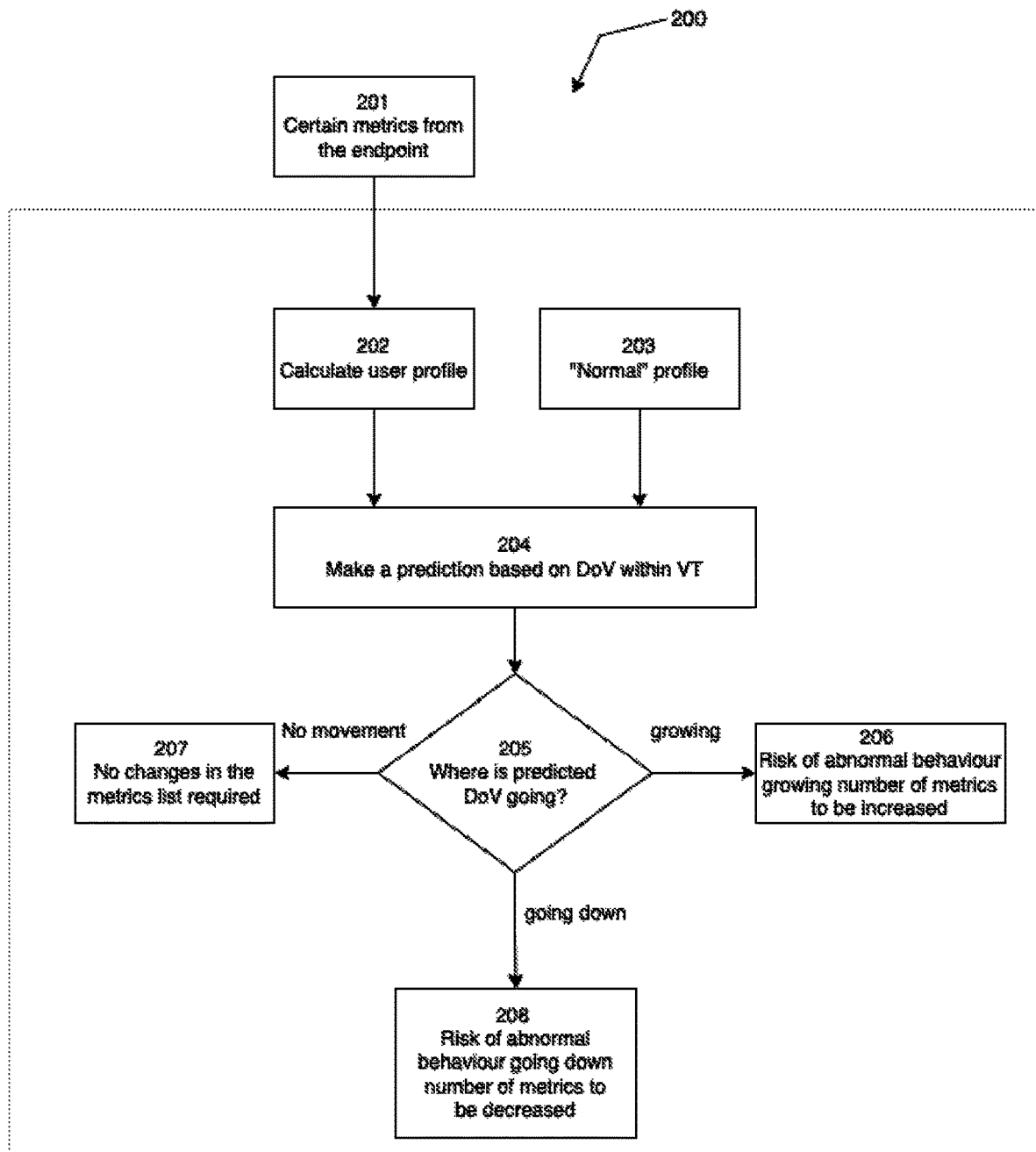
FIG. 2 shows an exemplary procedure for components and interactions of a Resource Optimizer for Behavior Monitor method according to an exemplary embodiment.

FIG. 2 shows the components and interactions 200 of a Resource Optimizer for Behavior Monitor (ROBM) method in an exemplary embodiment of the present invention.

Upon receipt of certain data from the endpoint (201), an endpoint "user profile" is calculated (202), and, in step (204), the endpoint "user profile" is compared to a "normal profile" (203).

In step 204, a prediction is made based on a degree of variance (DoV) with a variance threshold (VT).

In step 205, a prediction is made based on machine learning algorithms on a movement of a DoV trend within the predetermined VT in case that the DoV is within the VT.

If the DoV prediction trend is not changing against the VT (i.e., no movement), then it is determined at step 207 that the behavior of the monitored user is normal. No action is taken.

If the DoV prediction trend is going up against the VT at step 206, then it is determined that the risk of abnormal behavior is growing, and the number of metrics monitored is increased.

If the DoV prediction trend is going down against the VT, then it is determined at step 208 that the risk of abnormal behavior is going down and the number of metrics monitored at this specific point of time is decreased.

For cases when the DoV is out of the VT, an incident should be created as per logic of the user behavior analysis system itself or it should be shared with any other system to react accordingly.

In one certain embodiment, new users always have defined or all possible metrics monitored by the system to get some user behavior over a defined period of time. After that period of time the system starts to reduce the number of metrics until abnormal behavior is detected.

As an example of resource optimization, the following example can be provided. Users are described by different metrics based on the keyboard input interceptor. Deviations from "normal" behavior can be identified. If a machine learning algorithm identifies a lower risk of abnormal behavior, the system switches off some interceptors. Examples of such interceptors include those based on application behavior or specific applications. Alternatively, interceptor metrics are reduced. For example, only specific websites are monitored rather than all websites visited. Such reductions improve the performance of the endpoint because the system is not collecting and analyzing the content users work with.

Once the system identifies a higher risk of abnormal behavior, additional interceptors are activated. For example, monitoring of specific applications, or a number of metrics are increased for the particular interceptor. In an embodiment, the increase comprises monitoring of all websites the user accesses, instead of a subset of these websites.

The system is implemented in stages. In an embodiment, all applications, websites, or other events that the system collects and analyzes is limited to information or metrics based on the user behavior deviations.

It is noted that some portions of the detailed description are presented in terms of algorithms and symbolic representations of operations within a computer. An algorithm is a series of defined steps leading to a desired end state or result. In example implementations, the steps carried out require physical manipulations of tangible quantities for achieving a tangible result.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

The example embodiments are not described with reference to any programming language. It will be appreciated that a variety of programming languages may be used to implement the teachings of the example implementations as described herein. The instructions of the programming languages may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Moreover, the various functions described can be performed in a single unit or can be spread across a number of components in any number of ways. When performed by software, the methods may be executed by a processor, such as a general-purpose computer, based on instructions stored on a computer-readable medium. If desired, the instructions can be stored on the medium in a compressed or encrypted format. Various aspects or components of the described example implementations may be used singly or in any combination.

The invention claimed is:

1. A method for optimizing computing resources used to monitor a user at an endpoint in a computing system for abnormal behavior, the method comprising:
   installing a backend software component at a server and under microprocessor control, and an agent at the endpoint;
   collecting a plurality of historical metrics from the endpoint, wherein the historical metrics are related to binary scripts executed by an application installed at the endpoint and;
   building a baseline profile for the binary scripts of the application executed at the endpoint based on the plurality of historical metrics collected from the endpoint;
   intercepting, by the agent at the endpoint, first data of the user, wherein the data comprises a set of first metrics comprising all binary scripts executed by the application at the endpoint during a first time period;
   parsing, by the agent at the endpoint, the intercepted first data and storing the intercepted first data in a structured format;
   submitting the stored intercepted first data to the backend software component at the server;
   building, by the backend software component at the server, a profile for the user based on binary scripts executed by the application at the endpoint from the intercepted first data;
   intercepting, by the agent, second data of the user, wherein the second intercepted data comprises the set of first metrics related to binary scripts executed by the application at the endpoint while under the user's control during a second time period;
   predicting, by the backend software component at the server, a deviation trend in the second intercepted data of the user, wherein the trend is calculated as the variation in the second intercepted data from the profile for the user either toward or away from the baseline profile for the binary scripts of the application executed at the endpoint;
   creating, by the backend software component at the server, second set of metrics comprising a reduced set of binary scripts of the application when the predicted deviation trend from the profile for the user is toward the baseline profile above a predetermined threshold;
   distributing the second set of metrics to the agent;
   intercepting, by the agent at the endpoint, third data of the user, wherein the third intercepted data comprises reduced data corresponding to the reduced set of binary scripts of the application.

2. The method of claim 1, wherein the step of intercepting first data of the user further comprises intercepting network traffic metrics.

3. The method of claim 1, wherein the step of intercepting first data of the user further comprises intercepting device access metrics.

4. The method of claim 1, wherein the second set of metrics comprises an increased set of binary scripts of the application when the predicted deviation is moving away from the baseline profile above a predetermined threshold and the third intercepted data comprises increased data corresponding to the increased set of binary scripts of the application.

5. The method of claim 1, wherein the step of intercepting first data of the user further comprises intercepting application behavior of a plurality of applications running at the endpoint.

6. The method of claim 1, wherein the step of predicting further comprises predicting a deviation from the baseline profile by:
   calculating a degree of variance (DoV) between the user profile and the baseline profile;
   comparing the calculated DoV to a predetermined Variance Threshold (VT); and
   predicting, based on machine learning algorithms, a movement of a trend of the DoV within the VT toward or away from the baseline profile.

7. A method for optimizing computing resources used to monitor a user at an endpoint in a computing system for abnormal behavior, the method comprising:
   installing a backend software component at a server and an agent at the endpoint;
   providing a baseline profile to the backend software component at the server, wherein the baseline profile comprises historical metrics related to binary scripts executed by an application installed at the endpoint;
   intercepting, by the agent, data of the user, wherein the data of the user comprises a set of metrics comprising binary scripts executed by the application at the endpoint during a first period of time;
   parsing, by the agent at the endpoint, the intercepted data of the user and storing the intercepted data of the user in a structured format;
   submitting the stored intercepted data of the user to the backend software component at the server;
   predicting, by the backend software component at the server, a deviation in the intercepted data of the user from the baseline profile;
   creating, by the backend software component at the server, a reduced set of metrics comprising a reduced set of binary scripts of the application when the deviation from the intercepted data toward the baseline profile is above a predetermined threshold; and
   distributing the reduced set of metrics list to the agent at the endpoint.

8. The method of claim 7, wherein the step of intercepting further comprises intercepting network traffic metrics.

9. The method of claim 7, wherein the step of intercepting further comprises intercepting device access metrics.

10. The method of claim 7, further comprising creating, by the backend software component at the server, an increased set of metrics comprising an increased set of binary scripts of the application when the predicted deviation is moving away from the baseline profile above a predetermined threshold and the third intercepted data comprises increased data corresponding to the increased set of binary scripts of the application.

11. The method of claim 7, wherein the step of intercepting further comprises intercepting application behavior.

12. The method of claim 7, wherein the step of predicting further comprises predicting a deviation from the baseline profile by:
- calculating a degree of variance (DoV) between the user profile and the baseline profile;
- comparing the calculated DoV to a predetermined Variance Threshold (VT); and
- predicting, based on machine learning algorithms, a movement of a trend of the DoV within the VT toward or away from the baseline profile.

13. A system for optimizing computing resources used to monitor a user at an endpoint in a computing system for abnormal behavior, the system comprising:
- a processor coupled to a memory storing instructions;
- a backend software component, installed at a server, under control of the processor and in communication with the endpoint;
- a plurality of agents running at the endpoint configured to intercept user data, the user data comprising a set of metrics related to binary scripts executed by an application installed at the endpoint;
- wherein the plurality of agents are further configured to parse the intercepted user data; and submit the intercepted user data to the backend software component in a structured format, wherein the backend software component is configured to collect the intercepted user data from the plurality of agents; and is further configured to calculate deviation from or toward a baseline profile for the endpoint, create an adjusted set of metrics, and distribute the adjusted set of metrics comprising binary scripts executed by the application at the endpoint,
- wherein the adjusted set of metrics comprises decreased metrics when the deviation toward the baseline is above a predetermined threshold.

14. The system of claim 13, wherein the plurality of agents is further configured to intercept network traffic metrics or device access metrics.

15. The system of claim 13, wherein the adjusted set of metrics comprises increased metrics when the deviation away from the baseline profile is above a predetermined threshold.

16. The system of claim 13, wherein the plurality of agents is further configured to intercept application behavior.

17. The system of claim 13, wherein the backend software component at the server is further configured to predict a deviation from the baseline profile, in which the backend software component assesses available characteristics of a particular endpoint, calculates an endpoint user profile, calculates a degree of variance (DoV) between the user profile and the baseline profile, compares the calculated DoV to a predetermined Variance Threshold (VT), and predicts, based on machine learning algorithms, a movement of a trend of the DoV within the VT toward or away from the baseline profile.

* * * * *